United States Patent [19]

Gish

[11] 4,093,965
[45] June 6, 1978

[54] SPEED-SWITCHABLE READBACK SIGNAL EQUALIZATION AND DIRECT-CURRENT RESTORATION

[75] Inventor: David B. Gish, Upland, Calif.
[73] Assignee: Bell & Howell Company, Chicago, Ill.
[21] Appl. No.: 714,926
[22] Filed: Aug. 16, 1976
[51] Int. Cl.² ............................................. G11B 5/45
[52] U.S. Cl. ........................................ 360/65; 360/41
[58] Field of Search ........................... 360/65, 41, 46

[56] References Cited
U.S. PATENT DOCUMENTS

| | | | |
|---|---|---|---|
| 3,339,192 | 8/1967 | Zeller | 360/65 |
| 3,436,490 | 4/1969 | Roelofs | 360/65 |
| 3,441,921 | 4/1969 | Jacoby | 360/65 |
| 3,465,321 | 9/1969 | Reisfeld | 360/65 |
| 3,864,734 | 2/1975 | Gish | 360/41 |

*Primary Examiner*—Jay P. Lucas
*Attorney, Agent, or Firm*—Benoit Law Corporation

[57] ABSTRACT

Apparatus for recovering signals read back from a recording medium at different relative recording medium speeds have speed-switchable equipment for equalizing readback signals over frequency bands having different peak to-bandedge roll-off regions for different relative recording medium speeds. High-frequency equalization means in the speed-switchable equipment equalize readback signals in the peak-to-bandedge roll-off regions by providing speed-switchable frequency peaking characteristics and speed-switchable cut-off frequency characteristics and in company with each other shift the frequency peaking characteristics and cut-off frequency characteristics to the different peak-to-bandedge roll-off regions for different relative recording medium speeds.

Methods and apparatus for direct-current restoration of an alternating signal provide a first signal analogous to the alternating signal and asymmetrical in a first sense relative to a reference voltage, and a second signal analogous to the alternating signal and asymmetrical in a second sense relative to a reference voltage. These first and second signals are combined and disposed symetrically about a direct-current reference voltage.

15 Claims, 4 Drawing Figures

SPEED-SWITCHABLE READBACK SIGNAL EQUALIZATION AND DIRECT-CURRENT RESTORATION

BACKGROUND OF THE INVENTION

1. Field of the Invention

The subject invention relates to reproduction or readback of recorded information and, more specifically, to the equalization of signals read back from a recording medium. The subject invention also relates to methods and apparatus for the direct-current restoration of readback or other alternating signals.

2. Description of the Prior Art

If a constant current within the passband of interest is fed into the recording head of a magnetic tape recorder or into a similar recording device, and the resulting recording subsequently read back, the voltage appearing across the output of a playback head or similar readback device varies in amplitude in accordance with one of the well-known playback response curves having the familiar ascending segment, turnover portion and descending segment (see, for instance, N. M. Haynes, TRANSISTOR CIRCUITS FOR MAGNETIC RECORDING [Howard W. Sams/Bobbs-Merrill, Catalog No. MTR-1], Chapter X EQUALIZATION [hereinafter cited as "Transistor Circuits book"]).

Particular problems are presented by the descending segment of the playback response curve, representing compound losses from three basic sources: the tape or other recording medium, the head or other readback device, and the contact between recording medium and readback device. For instance, self-demagnetization of short wavelengths or high frequencies is characteristic of tape loss. Head losses are caused by hysteresis, eddy currents, and winding capacitance. Contact losses are attributable to head-to-tape or readback device-to-recording medium separation and similar effects.

The descending segment of the playback response curve covers the peak-to-bandedge roll-off region of the frequency band of interest which is different for different playback parameters. For instance, families of playback response curves in this respect may be produced by varying the coercivity of the recording medium or the gap length in the readback device. More typically, families of the playback response curve are produced by readback at different relative recording medium speeds, with an increase in recording medium speed shifting the peak-to-bandedge roll-off region or descending segment to higher frequencies.

In practice, it is often necessary to provide frequency peaking characteristics, sometimes also referred to as a "skirt", at the descending segment of the playback response curve. Because of the similarity of that frequency peaking characteristic to a resonance curve of an oscillating circuit, it has long been customary to employ LC networks in high-frequency equalization equipment (see the above mentioned Transistor Circuits book, pp. 151, 157 and 158). In practice, this has led to the need of bothersome phase and Q adjustments, to detrimental ringing effects and to other drawbacks, such as inductive hum pickup and the relative bulkiness and component expense associated with the use of inductors.

In an effort to overcome these disadvantages, high-frequency equalization circuits using a differentiator type amplifier without inductor elements have been proposed.

In this connection, it has been found that high-frequency noise occurring outside the bandwith of the system causes a significant reduction in signal-to-noise ratio with resultant increase in the system error rate. Elimination of this noise has required a separate low-pass filter stage which, in a multi-speed system, has to be switched with changing recording medium speed, leading to a physically cumbersome and expensive installation.

A further problem connected with the recovery of signals read back from a recording medium is brought about by the well-known "baseline shift" which affects particularly the reproduction of high density digital data. This baseline shift is a type of distortion present in the readback signal because of the non-direct-current response characteristic typical of magnetic tape and similar recording and playback systems. Its presence causes great difficulty in properly detecting the digital data, resulting in high bit error rates and sensitivity to various types of data patterns. Accepted methods of eliminating the problem comprise the use of low-direct-current content data coding techniques, such as the "bi-phase" and "delay modulation" codes. In practice, such codes display deficiencies in terms of maximum bit packing densities on the recording medium, so that the use of enhanced NRZ (non-return to zero) techniques which allow much higher bit packing densities has come to be preferred. Unfortunately, these higher bit packing densities tend to occur at the expense of greater direct-current content with resultant baseline drift.

In an effort to overcome the latter problem, direct-current restoration has been resorted to. The basic form of direct-current restorer is, however, not suited to the reproduction and detection of high density digital data from a recording medium. The primary reason for this is the requirement that data be detected at the midpoint of the excursion of its voltage between the peak positive and peak negative values. For simple and accurate detection, the midpoint is set for zero volts direct-current. On the other hand, the basic direct-current restorer establishes a reference near either the positive or the negative excursion of the signal.

Similar problems exist in other fields, so that the utility of the subject invention is not limited to readback technology.

SUMMARY OF THE INVENTION

It is a broad object of this invention to overcome the above mentioned disadvantages.

It is a related object of this invention to provide improved apparatus and techniques for the recovery of signals read back from a recording medium.

It is a germane object of this invention to provide improved apparatus and techniques for the recovery of signals read back from a recording medium at different relative recording medium speeds.

It is a similar object of this invention to provide improved apparatus and techniques for the equalization and, in particular, the high-frequency equalization of readback signals, particularly for different relative recording medium speeds.

It is also an object of this invention to provide improved apparatus and systems for recovering alternating signals read back from a recording medium.

It is further an object of this invention to provide improved methods and apparatus for direct-current restoration of an alternating signal.

Other objects of the invention will become apparent in the further course of this description.

From a first aspect thereof, the subject invention resides in an apparatus for recovering signals read back from a recording medium at different relative recording medium speeds and, more specifically, resides in the improvement comprising, in combination, speed-switchable means for equalizing readback signals over frequency bands having different peak-to-bandedge roll-off regions for different relative recording medium speeds, and high-frequency equalization means in the speed-switchable means for equalizing readback signals in the peak-to-bandedge roll-off regions, including active low-pass filter means for providing speed-switchable frequency peaking characteristics and speed-switchable cut-off frequency characteristics and for shifting the frequency peaking characteristics and cut-off frequency characteristics in company with each other to the different peak-to-bandedge roll-off regions for different relative recording means speeds, said active low-pass filter means including operational amplifier means having input means and output means, a speed-switchable RC network connected to said input and output means, and series-connected first and speed-switchable second resistor means, said first resistor means being connected between said input and output means, and said second resistor means being connected between said input means and a reference potential, with the ratio of the resistance, $R_1$, of said first resistor means to the resistance, $R_2$, of said second resistor means being such that $R_1/R_2$ plus one is at least two, and said speed-switchable means including means for switching said speed-switchable RC network and second resistor means.

From another aspect thereof, the subject invention resides in apparatus for recovering signals read back from a recording medium at different relative recording medium speeds and, more specifically, resides in the improvement comprising, in combination, speed-switchable means for equalizing readback signals over frequency bands having different peak-to-bandedge roll-off regions for different relative recording medium speeds, and high-frequency equalization means in said speed-switchable means for equalizing readback signals in the peak-to-bandedge roll-off regions, including active low-pass filter means for providing speed-switchable frequency peaking characteristics and speed-switchable cut-off frequency characteristics and for shifting said frequency peaking characteristics and cut-off frequency characteristics in company with each other to said different peak-to-bandedge roll-off regions for different relative recording medium speeds.

From another aspect thereof, the subject invention resides in apparatus for recovering signals read back from a recording medium at different relative recording medium speeds and, more specifically, resides in the improvement comprising, in combination, speed-switchable means for equalizing readback signals over frequency bands having different peak-to-bandedge roll-off regions for different relative recording medium speeds, high-frequency equalization means in the speed-switchable means for equalizing readback signals in the peak-to-bandedge roll-off regions, including means for providing speed-switchable frequency peaking characteristics and speed-switchable cut-off frequency characteristics and for shifting the frequency peaking characteristics and cut-off frequency characteristics in company with each other to the different peak-to-bandedge roll-off regions for different relative recording medium speeds, and means connected to the high-frequency equalization means for direct-current restoration of equalized readback signals, including means for providing a first signal analogous to the equalized readback signals and asymmetrical in a first sense relative to a reference voltage, means for providing a second signal analogous to the received alternating signal and asymmetrical in a second sense relative to a reference voltage, and means connected to the first and second signal providing means for combining the first and second signals and disposing the combined first and second signals symmetrically about a direct-current reference voltage.

From yet another aspect thereof, the subject invention resides in apparatus for recovering alternating signals read back from a recording medium and, more specifically, resides in the improvement comprising, in combination, means for receiving the alternating readback signal, means connected to the receiving means for providing a first signal analogous to the received alternating readback signal and asymmetrical in a first sense relative to a reference voltage, means connected to the receiving means for providing a second signal analogous to the received alternating readback signal and asymmetrical in a second sense relative to a reference voltage, and means connected to the first and second signal providing means for combining the first and second signal and disposing the combined first and second signals symmetrically about a direct-current reference voltage.

From yet another aspect thereof, the subject invention resides in apparatus for recovering alternating signals read back from a recording medium at different relative recording medium speeds and, more specifically, resides in the improvement comprising, in combination, means for receiving the alternating readback signal, speed-switchable means connected to the receiving means for providing a first signal analogous to the received alternating readback signal and asymmetrical in a first sense relative to a reference voltage, speed-switchable means connected to the receiving means for providing a second signal analogous to the received alternating readback signal and asymmetrical in a second sense relative to a reference voltage, and means connected to the first and second signal providing means for combining the first and second signals and disposing the combined first and second signals symmetrically about a direct-current reference voltage.

From still another aspect thereof, the subject invention resides in apparatus for direct-current restoration of an alternating signal, comprising, in combination, means for receiving the alternating signal, means connected to the receiving means for providing a first signal analogous to the received alternating signal and asymmetrical in a first sense relative to a reference voltage, means connected to the receiving means for providing a second signal analogous to the received alternating signal and asymmetrical in a second sense relative to a reference voltage, and means connected to the first and second signal providing means for combining the first and second signals and disposing the combined first and second signals symmetrically about a direct-current reference voltage.

From yet another aspect thereof, the subject invention resides in a method of direct-current restoring an alternating signal, comprising in combination the steps of providing a first signal analogous to the alternating signal and asymmetrical in a first sense relative to a reference voltage, providing a second signal analogous to the alternating signal and asymmetrical in a second sense relative to a reference voltage, providing a direct-current reference voltage, combining the first and second signals, and disposing the combined first and second signals symmetrically about the direct-current reference voltage.

BRIEF DESCRIPTION OF THE DRAWINGS

The subject invention and its objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
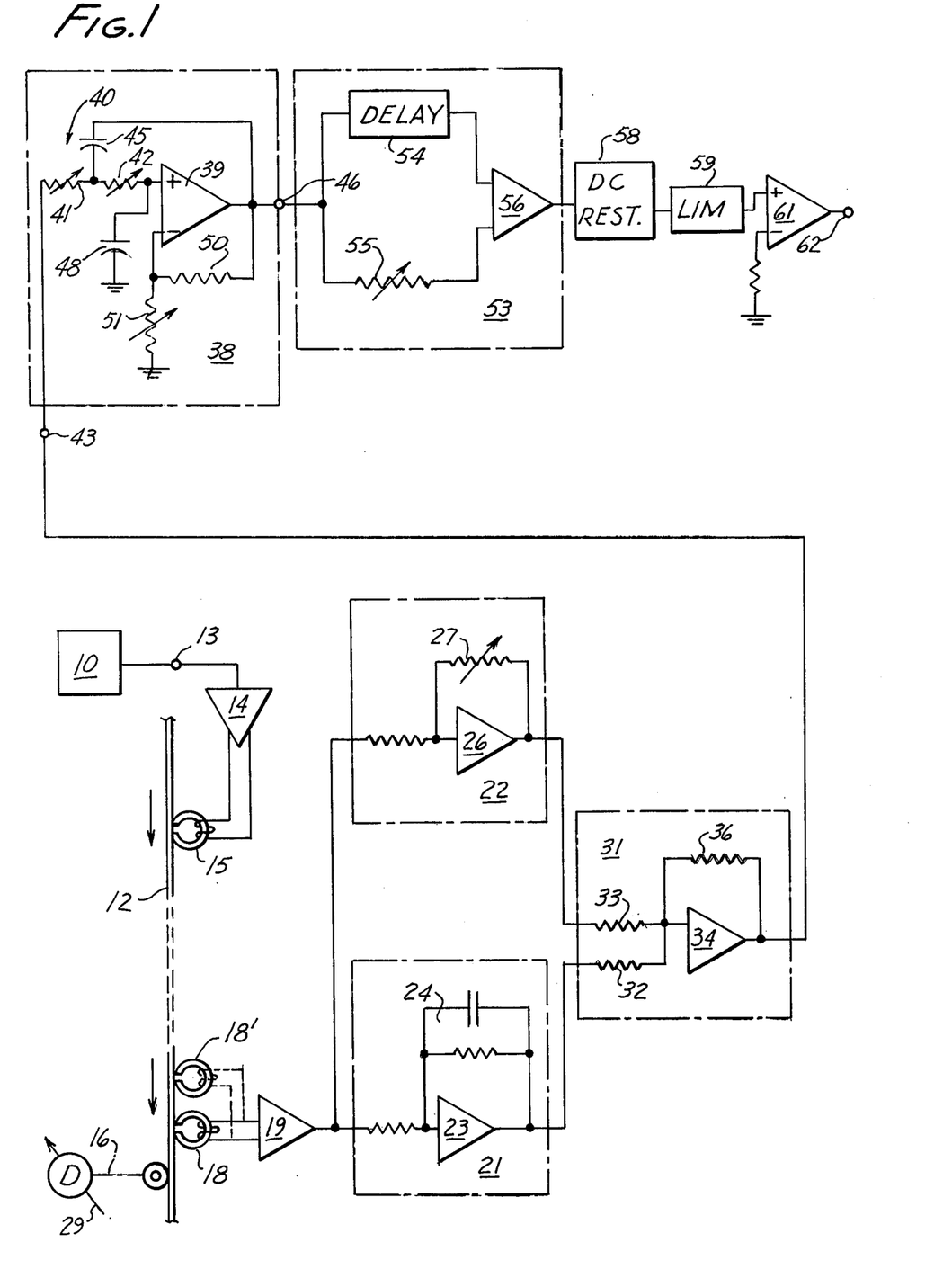
FIG. 1 is a block diagram of an apparatus for recovering pulse-code modulated digital data from a readback signal in accordance with a preferred embodiment of the subject invention.

The apparatus shown in FIG. 1 is similar to the apparatus for recovering pulse-code modulated digital data from a readback signal shown in my U.S. Pat. No. 3,864,734, issued to the subject assignee on Feb. 4, 1975, and herewith incorporated by reference herein.

In particular, FIG. 1 has a block 10 representing a source of digital data. By way of example, and not by way of limitation, this source may be a source of NRZ (non-return to zero) data to be recorded on a magnetic recording tape 12. By way of further example, the source 10 may include the data enhancer system disclosed in U.S. Pat. No. 3,820,083, by John L. Way, issued to the subject assignee on June 25, 1974, and herewith incorporated by reference herein. Briefly, that Way system provides enhanced NRZ data including parity bits in addition to data bits.

As shown in FIG. 1, the NRZ or other binary data provided by the source 10 are applied to an input terminal 13 of a recording amplifier 14 for a recording of these data, by means of a magnetic recording head 15, on a magnetic recording tape 15 which is advanced by a tape drive 16 relative to the recording head 15. It will, of course, be understood that magnetic recording of binary data is shown by way of example and not by way of limitation.

It desired, the binary data may be recorded on photographic film with the aid of modulated light-emitting recording devices, or on any other desired recording medium.

For a readback of the recorded data, the recording tape 12 is advanced by the tape drive 16, past a magnetic readback head 18. The readback signal is amplified by a readback preamplifier 19 of a conventional design.

The readback signal at the output of the preamplifier 19 suffers from differentiation effects, high-frequency losses, direct-current baseline shift, and phase distortion. Correction for low-frequency differentiation may be effected by integrating a portion of the readback signal and by adding such integrated portion to an amplified version of the readback signal. To this effect, the preamplified readback signal is applied to an integrating stage 21 for low-frequency equalization, and to a mid-frequency gain stage 22 for mid-band gain adjustment.

The integrating stage 21 comprises an operational amplifier 23 and an RC network 24 connected in a feedback path of the amplifier 23. The mid-frequency gain stage 22 comprises an amplifier 26 having an adjustable feedback path 27. In practice, the adjustable feedback path 27 may be switched together with a switching of the speed of the tape 12 if the tape drive 16 has a speed switching feature as indicated by the arrow 29 in FIG. 1.

A summing stage 31 comprising summing resistors 32 and 33 and an operational amplifier 34 with feedback resistor 36 is employed to combine the outputs of the stages 21 and 22.

A partial high-frequency equalization stage 38 is provided after the summing stage 31. According to the illustrated preferred embodiment of the subject invention, the high-frequency equalization stage 38 is an active low-pass filter including an operational amplifier 39, an RC network 40 including resistors 41 and 42 connected in series between an input 43 of the stage 38 and the non-inverting input (+) of the operational amplifier 39, a capacitor 45 connected between an output of the operational amplifier 39 at the output 46 of the stage 38 and the junction point between the resistors 41 and 42, and a capacitor 48 connected between the non-inverting input of the amplifier 39 and ground. The active low-pass filter of stage 38 also includes series-connected resistors 50 and 51, with the resistor 50 being connected between the inverting input and the output of the amplifier 39, and the resistor 51 between the inverting input and ground.

Figure 2:
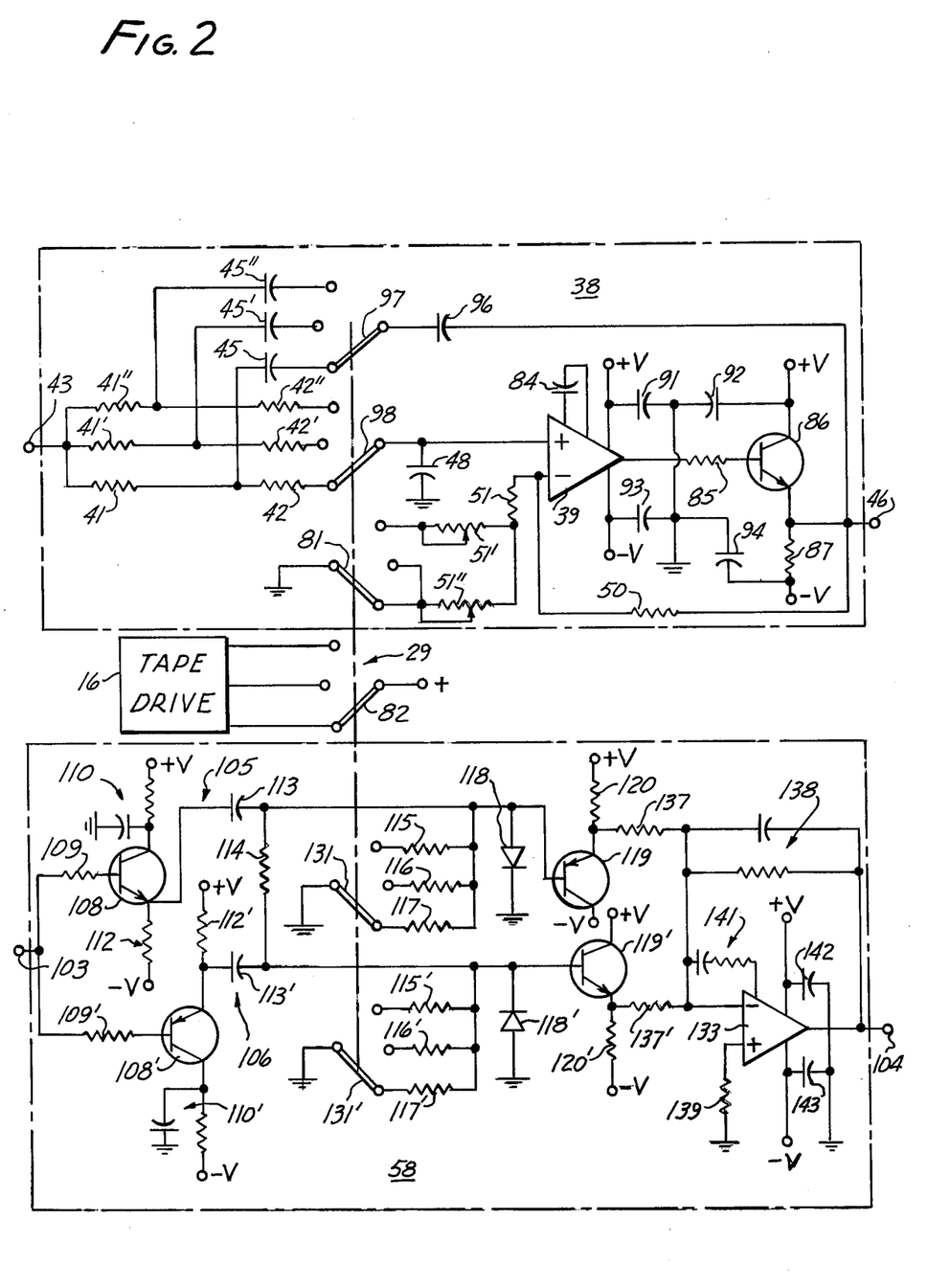
FIG. 2 is a circuit diagram of high-frequency equalization and direct-current restoration circuits in accordance with preferred embodiments of the subject invention and useful in the apparatus of FIG. 1.
Figure 3:
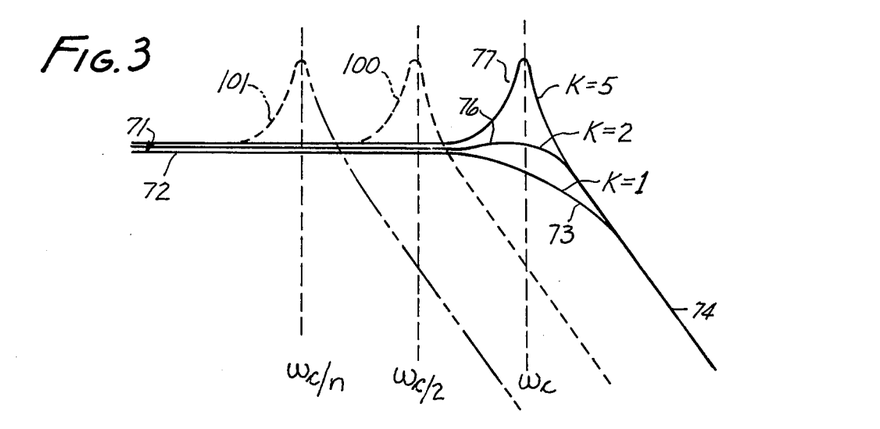
FIG. 3 is a family of amplitude versus frequency curves illustrating the operation of the high-frequency equalization of the apparatus of FIGS. 1 and 2 in the peak-to-bandedge region at different recording medium speeds according to a preferred embodiment of the subject invention.

The nature and operation of the stage 38 will be further disclosed in connection with FIGS. 2 and 3 and it will be understood that the components 41, 42, 45 and 51 may be variable or switchable in conjunction with a switching of the speed of advance of the tape 12.

The partially equalized signal is applied to a differencing stage 53. This differencing stage has a time delay network 54 for delaying the partially equalizing signal by one-half bit time of the binary data contained therein. A gain trim resistor 55 is connected in parallel to the delay network 54. The variable resistor 55 does not delay the partially equalized signal, but provides for a phase adjustment compensating for high-frequency attenuation in the delay network 54. It will be noted that the component 55 serves to provide a relative undelayed version of the partially equalized readback signal.

The differencing stage 53 also includes a differential amplifier 56 for differentially amplifying the delayed and non-delayed signals received from the delay network 54 and from the phase adjustment resistor 55, respectively.

The differencing stage 53 operates as a detector of the readback signal, the nature and operation of which has been described in my above mentioned United States patent. The differential amplifier 56 will have a positive or a negative output signal, according to whether the played-back signal is increasing or decreasing.

Figure 4:
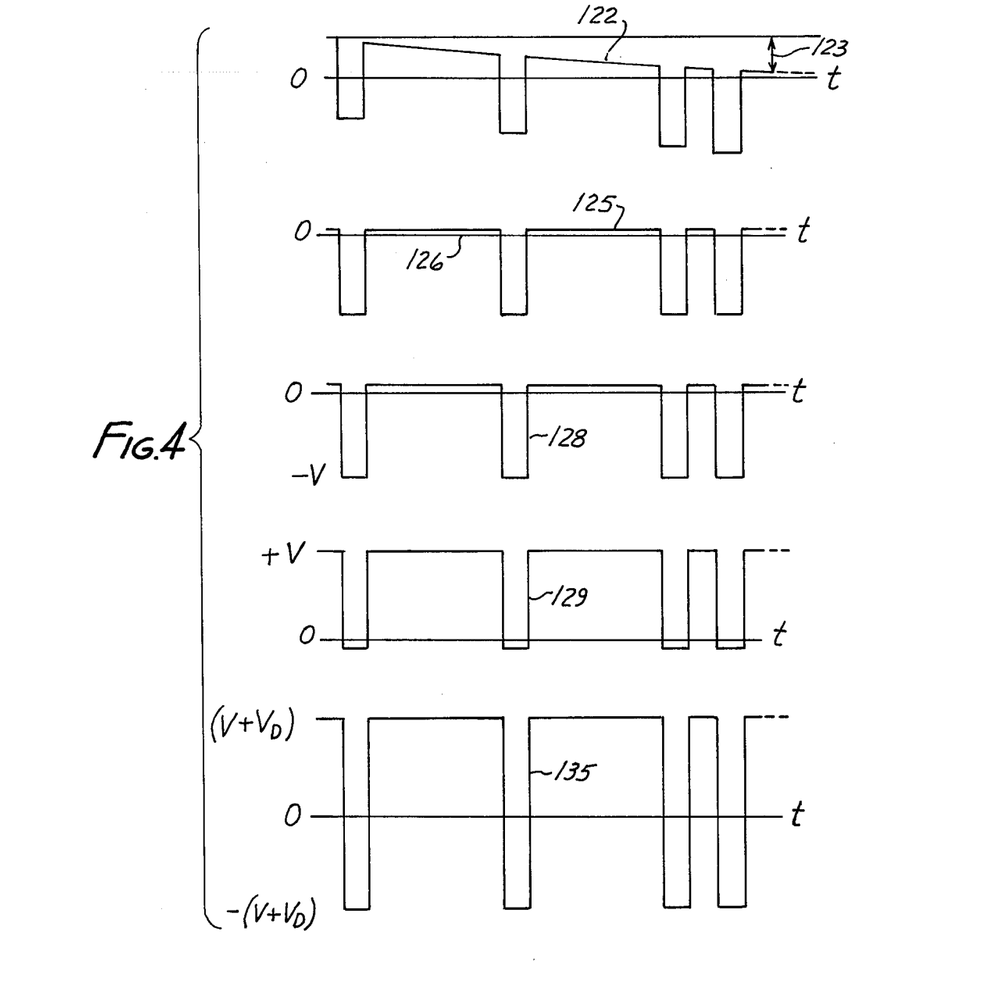
FIG. 4 is a family of voltage versus time plots illustrating the background and the operation of the direct-current restoration apparatus and methods according to a preferred embodiment of the subject invention and usable in the apparatus of FIGS. 1 and 2.

The output signal of the differential amplifier 56 is applied to a direct-current restorer 58 which is connected to the differencing stage 53 and which may be constructed according to the aspect of my subject invention more fully disclosed in connection with FIGS. 2 and 4.

The output of the direct-current restorer 58 is connected to a limiter 59 which serves to increase the dynamic range of the amplifier. The limited signal is processed by a comparator 61 and is then applied to a systems output terminal 62. The output signal at 62 is a digital signal corresponding to the difference between the readback signal delayed at 54 and the relatively undelayed version provided by way of the gain trim resistor 55, and being direct-current restored.

The signal at terminal 62 is completely equalized and includes the data provided by the source 10 prior to recording.

It should be understood at this juncture that the circuits and components of FIG. 1, except for the circuits or stages 38 and 58, may be the same as in the system of my above mentioned U.S. patent.

The data provided at the systems output 62 may be utilized in any desired manner. For instance, these data may be decoded and printed out or stored or displayed with a conventional device. In particular, the data provided at the systems output 62 may be applied to a bit synchronizer for a regeneration of clock pulses synchronized with the readback data. These data may also be subjected to a removal of parity bits, as desired. For instance, the data may be applied to a bit synchronizer of the type disclosed in the above mentioned Way patent.

Suitable decoder or parity bit removing equipment is also disclosed in the above mentioned Way patent and in the U.S. Pat. No. 3,764,998, by William H. Spencer, issued Oct. 9, 1973 to the subject assignee, and in its U.S. Pat. No. Re. 28,257, by William H. Spencer and Brian K. Curtis, reissued Nov. 26, 1974 to the subject assignee, and herewith incorporated by reference herein.

The high-frequency equalization stage 38 and the direct-current restorer 58 will now be disclosed more specifically with reference to FIG. 2.

By way of background, it may be helpful to consider that an active filter generally of the type herein under consideration normally is designed to provide maximally flat or Butterworth response, maximum attenuation or Chebyshev response, or linear phase shift or Bessel response. By manipulating the gain of the active element in the Butterworth filter configuration, a variable, pronounced peaking effect is produced, which approximates the desired frequency peaking characteristic for high-frequency readback signal equalization. I have discovered that this provides a very useful feature for present purposes, as the frequency peaking only occurs in the region of the cut-off frequency characteristic, leaving the low-frequency passband and high-frequency stopband characteristics relatively undisturbed.

The result is an excellent building block for high-frequency equalization and filtering.

In terms of FIGS. 1 and 2, we may establish K as the dc gain of the active element:

$$K = 1 + (R_{50}/R_{51}) \tag{1}$$

wherein:
$R_{50}$ = Resistance value of resistor 50; and
$R_{51}$ = Resistance value of resistor 51

Basic Butterworth filter response is obtained when K is equal to one (i.e. $R_{51}$ is open circuit) while the resistors 41 and 42 in the network 40 have equal resistance values and the capacitors 45 and 48 have equal capacitance values, whereby the filter circuit displays an angular frequency $\omega_c$ of $$\omega_c = 1/RC \tag{2}$$

wherein:
$R$ = The identical resistance value of resistors 41 and 42; and
$C$ = The identical capacitance value of capacitors 45 and 48

In the equalization stage 38 according to the preferred embodiment of the subject invention shown in the drawings, the desired bandedge frequency peaking characteristic is provided by making K variable over a predetermined range, such as a range of from 2 to 5 in the case of instrumentation tape playback equalization, for instance.

Referring now to the solidly drawn portion of FIG. 3, a basic Butterworth filter response is shown by a curve 71 having a flat segment 72 joined by a roll-off segment 73 which obtains for the case of K = 1 and which extends into a cut-off segment or region 74 decreasing, for instance, at −12 db per octave.

Because of the nature and purpose of the equalization process it is well known to be necessary to provide frequency peaking or a "skirt" at the location of the curve segment 73. In this respect, reference may, for instance, be had to FIGS. 10-4 and 10-7 of the above mentioned Transistor Circuits book. By way of illustration, the curve 71 has been shown in FIG. 3 as having a first frequency peaking characteristic, represented by a curve segment 76, and a second frequency peaking characteristic represented by a skirt-shaped curve segment 77. For instance, the characteristic 76 may be provided for equalizing signals played back by the head 18, and the peaking characteristic 77 may be provided for equalizing signals played back by a different head 18', indicated in FIG. 1.

In practical terms, the characteristic 76 may be brought about by making the above mentioned coefficient K to be equal two (K = 2). Similarly, the characteristic 77 may be accomplished by making K equal to five (K = 5).

As apparent from the above equation (1) the ratio of the resistance values of resistors 50 and 51 may be adjusted for this purpose.

In the preferred embodiment shown in FIG. 2, two resistors 51' and 51" are individually connected in series with the resistor 51 to provide suitable adjustment of the above mentioned coefficient K. In practice, the variable resistor 51' may be adjusted to a first resistance value for a given tape speed, such as 120 inches per second, while the variable resistor 51" may be adjusted to another value for one or more tape speeds, such as speeds from 15/16 to 60 inches per second, to name a practical example. If desired, adjustment of the resistors 51' and 51" may be carried out manually for each given playback head and other compound loss-producing parameter or may, of course, be effected automatically upon a switching of playback heads, for instance.

The speed switching of the resistors 51' and 51" is, of course, most preferably coordinated with the switching of the tape drive system 16 at 29. To this end, the resistors 51' and 51" are speed-switchable via a selector switch 81 which is ganged to a tape speed selector switch 82 of the tape drive 16.

In terms of practical implementation, the amplifier 39 in the circuit 38 shown in FIG. 2 may, for instance, be a whiteband operational amplifier, Type CA3100, as shown, for instance, in the RCA Integrated Circuits Data book (1976), pp. 257 et seq.

A compensation capacitor 84 may be connected to the pins 1 and 8 of that type of operational amplifier.

The output of amplifier 39 is connected via a base resistor 85 to the base of a transistor 86 which is connected as an emitter follower having an emitter resistor 87 and operating as a buffer stage. By way of example, the transistor 86 may be of the Type 2N2222A as described, for instance, in THE SEMICONDUCTOR DATA LIBRARY, Series A, Volume I, by Motorola Inc. (1974), pp. 2-252 et seq.

The operational amplifier 39 and transistor 86 are energized with direct current as shown as equipped with decoupling capacitors 91 to 94, as shown.

As further shown in FIG. 2, the output of the transistor 86, being the output 46 of the stage 38, is connected via resistor 50 to the resistor 51 and inverting (−) input of the operational amplifier 39. In addition, the output of the transistor 86 is connected via a coupling capacitor 96 to the movable contact of a selector switch 97 which is ganged with the speed selector switch 82 and which sequentially connects the capacitor 45 and substitute capacitors 45' and 45" between the output of the buffer stage 86 and the junction point between the series-connected resistor pair 41 and 42 or substitute resistor pairs 41' and 42' or 41" 42". In practice, the capacitors 45, 45' and 45" may be similar, or even identical, for similar speeds. In a prototype of the illustrated apparatus, I have used identical capacitors 45, 45' for tape speeds from 15/16 to 60 inches per second and a somewhat smaller capacitor (e.g. about 20% smaller) for a tape speed of 120 inches per second.

As shown in FIG. 2, the appropriate resistor pairs are switched in unison via a selector switch 98 with the switching of the capacitors 45, 45' and 45". To this end, the selector switch 98 is ganged with the selector switches 81, 82 and 97. In this manner, the selector switch 98 sequentially connects any one of the resistor pairs 41 and 42, 41' and 42' and 41" and 42" to the non-inverting (+) inut of the amplifier 39 and to the capacitor 48.

In this manner, the stage 38 provides speed-switchable frequency peaking characteristics and speed-switchable cut-off frequency characteristics and, by actuation of the ganged selector switches, shifts the frequency peaking characteristics and cut-off frequency characteristics in company or unison with each other to the different peak-to-bandedge roll-off regions for the different relative recording medium or tape speeds.

The latter feature is quite important and will now more fully be explained with the aid of FIG. 3.

In particular, FIG. 3 shows with the aid of the solidly illustrated curve having frequency peaking regions 76 and 77, and with the aid of a dotted curve 100 and phantom curve 101 how different tape speeds require different placements of the peaking characteristics and cut-off characteristics in terms of frequency.

For instance, FIG. 3 illustrates this positioning in terms of an angular frequency $\omega_c$, as well as for a frequency $\omega_c/2$, being one octave lower, and for a yet lower frequency $\omega_c/n$, with $n$ being an integer larger than two in this case, for a speed at a lower octave.

If desired, reference may at this juncture be had to the above mentioned Transistor Circuits book, FIG. 10-2 showing a family of playback response curves for different recording medium speeds, and FIG. 10-4 showing a family of corresponding mirror image curves for the equalization process at different speeds. Comparing these families of curves of those FIGS. 10-2 and 10-4, and paying particular attention to the peak-to-bandedge roll-off regions, it will be appreciated how a speed-switched shifting of the frequency peaking characteristics and of the cut-off frequency characteristics simultaneously in company with each other is of great importance to as ideal a high frequency equalization as possible. In this respect, the subject invention, without resorting to LC networks entailing their above mentioned detriments, enables an automatic elimination of high-frequency noises at every tape speed, by shifting not only the frequency peaking characteristics 76 or 77, but also the cut-off frequency characteristics 74 as a function of tape speed, as illustrated in FIG. 3 which actually illustrates not only the problem solved by the subject invention, but also the operation and functioning thereof.

As disclosed in connection with FIGS. 1 and 2, the basic concept of this invention may be implemented in accordance with a preferred embodiment thereof with the aid of active low-pass filter means which, for example, may include combined operating amplifier means and RC filter components, without resort to any LC resonant circuits. As shown in FIG. 2, the adjustment of the frequency peaking characteristics and the speed-switching of frequency peaking and cut-off may be implemented by adjustment and/or speed-switching of the RC filter means.

The direct-current restorer 58 shown in FIG. 1 may, according to the illustrated preferred embodiment of the second aspect of the subject invention shown in FIG. 2, have an input terminal 103 connected to the output of the differencing stage 53 at the differential amplifier 56, and an output terminal 104 connected to the input of the limiter 59 shown in FIG. 1.

The restorer 58 further has a pair of direct-current restoration branches 105 and 106 connected to the input terminal 103. The restoration branch 105 has a transistor 108 having its base connected to the input terminal 103 via a base resistor 109. A decoupling network 110 is connected to the collector of the transistor 108.

The emitter of the transistor 108 is biased via an emitter resistor 112 and is further connected via a direct-current blocking capacitor 113 to a cross-coupling resistor 114, a bank of resistors 115, 116 and 117, to a diode 118 having its other terminal connected to ground and to the base of a transistor 119 having an emitter biased via an emitter resistor 120.

Like or corresponding parts in the branch 106 are designated by the same reference numeral as their counterparts in the branch 105 except that a prime mark (') has been employed with the reference characters of the corresponding parts in the branch 106. It should also be noted that the transistor 108 in the branch 105 is an NPN transistor and is biased as such, while the transistor 108' in the branch 106 is a PNP transistor and is biased as such. Also, the transistor 119 in the branch 105 is a PNP transistor, while the transistor 119' in the branch 106 is an NPN transistor.

The operation of the direct-current restorer 58 is explained with respect to the curves shown in FIG. 4 which are illustrated in a somewhat idealized manner as far as the square or angled appearance of the represented pulses is concerned. Nevertheless, one will recognize by way of background that the curve 122 shown at the top of FIG. 4 illustrates the familiar baseline shift or drift 123 to which unrestored pulse code modulated and other signals are subjected. In particular, the baseline shift 123, sometimes also referred to as "baseline gallop", is a problem characteristic of the reproduction of certain types of high density digital data recorded on magnetic tape or another information recording medium. This distortion is present in the reproduced signal caused by the non-direct-current response characteristic which is typical of magnetic tape systems, for instance.

By way of further background, the curve 125 in FIG. 4 shows how a conventional direct-current restorer establishes a reference 126 located near one of the extremes of the excursions of the reproduced signals. In practice, the type of direct-current restoration illustrated by the curve 125 is not suited to a reproduction and detection of high density digital data from a magnetic tape recorder or similar instrument. The primary reason for this resides in the requirement that detection of the data take place at the midpoint of the excursion of its voltage between the peak positive and peak negative values for simple and accurate detection. It would be preferable to set that midpoint for zero volts dc. The second aspect of the subject invention enables satisfaction of these desiderata.

In particular, the equalized but unrestored readback signal is applied via input terminal 103 and base resistors 109 and 109' to the bases of transistors 108 and 108'. These transistors operate in parallel as emitter followers and serve to provide impedance matching between the direct-current restorer and the preceding amplifier stage 56. The non-restored signal is applied to capacitors 113 and 113', which remove the direct-current component from the signal. The new direct-current references are established by diodes 118 and 118'.

The diodes serve to clamp the negative and positive excursions of the signal, respectively, to one diode voltage drop below and above ground as illustrated by the curves 128 and 129 in FIG. 4.

An RC time constant is formed by the capacitor 113 and one of the resistors 115 to 117 and by the capacitor 113' and one of the resistors 115' to 117'. The time constant is selected to be long enough to prevent decay of the lowest data frequency, but to be short enough to respond to rapid changes in baseline shift. For this reason, the time constant is switched with tape speed by means of selector switches 131 and 131' which are ganged to the tape speed selector switch 82 in order to select for these speeds an appropriate resistance value in combination with the capacitance of each capacitor 113 and 113'. Although time constant is changed with each speed in the illustrated preferred embodiment shown in FIG. 2, experiments have shown that a given time constant can typically be used for at least a two octave change in data rate. This renders the time constant relatively non-critical in the preferred circuit of the subject invention, in contrast to the situation prevailing in prior-art direct-current restorer circuits.

The two restored data signals, identical except for the direct-current baseline, are applied to emitter followers provided by the transistors 119 and 119', which provide impedance matching to a summing amplifier 133.

The summing amplifier 133 is a linear, wide bandwidth stage which sums the two signals illustrated by the curves 128 and 129, producing a combined signal illustrated by the curve 135 in FIG. 4.

As shown at 135 in FIG. 4, the output signal of the summing amplifier 133 has about twice the amplitude of each of the amplifier input signals 128 and 129. To be more exact, the amplitude of the output signal 135 extends from $(V+V_D)$ to $-(V+V_D)$, wherein $V_D$ stands for diode voltage drop. The output signal 135 provided by the summing amplifier 133 is symmetrical about zero volts dc. This signal is thus capable of being properly digitized by zero-cross detector circuitry. In the preferred embodiment shown in FIG. 1, the direct-current restored signal is applied to the above mentioned limiter 59 and hence to the comparator 61 and systems output terminal 62.

It will thus be recognized that the restorer branches 105 and 106 provide a first signal analogous to the equalized readback signal and asymmetrical in a first sense relative to a reference voltage, and a second signal analogous to the received alternating signal and asymmetrical in a second sense relative to a reference voltage, as illustrated by the waveforms 128 and 129 in FIG. 4. The summing amplifier 133 combines the mentioned first and second signal 128 and 129 and disposes these combined signals symmetrically about a direct-current reference voltage.

To this end, the inverting (−) input of the amplifier 133 is connected via resistors 137 and 137' to the emitters of the emitter followers 119 and 119'. A feedback network 138 extends between the amplifier output and the inverting (−) input. A biasing resistor 139 extends between the non-inverting (+) input of the amplifier 133 and ground.

By way of example, the amplifier 133 may be of the Type LM318 as described, for instance, in the LINEAR INTEGRATED CIRCUITS CATALOG by National Semiconductors (February 1975), pp. 2–175 et seq. A feed-forward compensation network 141 may be connected between the inverting (−) input and the pin 12 of the amplifier 133. Decoupling capacitors 142 and 143 may be employed in connection with the power supply of the amplifier 133. By way of further background, the transistors 108 and 119' may be of the familiar Type 2N3904, and the transistors 108' and 119 may be of the familiar Type 2N3906.

It will be recognized at this juncture that the utility of the direct-current restorer 58 is not limited by its nature to information playback systems. Rather, the direct-current restorer according to the subject invention may be employed for different applications in which the illustrated type of direct-current restoration is necessary or desirable.

The subject extensive disclosure will suggest or render apparent various modifications and variations within the spirit and scope of the subject invention to those skilled in the art.

I claim:

1. In apparatus for recovering signals read back from a recording medium at different relative recording medium speeds, the improvement comprising in combination:

speed-switchable means for equalizing readback signals over frequency bands having different peak-to-bandedge roll-off regions for different relative recording medium speeds; and high-frequency equalization means in said speed-switchable means for equalizing readback signals in said peak-to-bandedge roll-off regions, including active low-pass filter means for providing speed-switchable frequency peaking characteristics and speed-switchable cut-off frequency characteristics and for shifting said frequency peaking characteristics and cut-off frequency characteristics in company with each other to said different peak-to-bandedge roll-off regions for different relative recording medium speeds;

said active low-pass filter means including operational amplifier means having input means and output means, a speed-switchable RC network connected to said input and output means, and series-connected first and speed-switchable second resistor means, said first resistor means being connected between said input and output means, and said second resistor means being connected between said input means and a reference potential, with the ratio of the resistance, $R_1$, of said first resistor means to the resistance, $R_2$, of said second resistor means being such that $R_1/R_2$ plus one is at least two; and said speed-switchable means including means for switching said speed-switchable RC network and second resistor means.

2. Apparatus as claimed in claim 1, wherein:
said readback signals are subject to specific high-frequency compound losses; and
said high-frequency equalization means include means for adjusting said frequency peaking characteristics to said specific high-frequency compound losses.

3. In apparatus for recovering signals read back from a recording medium at different relative recording medium speeds, the improvement comprising in combination:

speed-switchable means for equalizing readback signals over frequency bands having different peak-to-bandedge roll-off regions for different relative recording medium speeds; and high-frequency equalization means in said speed-switchable means for equalizing readback signals in said peak-to-bandedge roll-off regions, including active low-pass filter means for providing speed-switchable frequency peaking characteristics and speed-switchable cut-off frequency characteristics and for shifting said frequency peaking characteristics and cut-off frequency characteristics in company with each other to said different peak-to-bandedge roll-off regions for different relative recording medium speeds.

4. Apparatus as claimed in claim 3, wherein:
said readback signals are subject to specific high-frequency compound losses; and
said low-pass filter means include means for adjusting said frequency peaking characteristics to said specific high-frequency compound losses.

5. Apparatus as claimed in claim 3, wherein:
said low-pass filter means include combined operating amplifier means and RC filter components; and
said means for simultaneously shifting said peaking characteristics and cut-off frequency characteristics include means for switching said RC filter components.

6. Apparatus as claimed in claim 5, wherein:
said readback signals are subject to specific high-frequency compound losses; and
said low-pass filter means include means for adjusting said frequency peaking characteristics to said specific high-frequency compound losses by adjustment of said RC filter means.

7. In apparatus for recovering signals read back from a recording medium at different relative recording medium speeds, the improvement comprising in combination:

speed-switchable means for equalizing readback signals over frequency bands having different peak-to-bandedge roll-off regions for different relative recording medium speeds;

high-frequency equalization means in said speed-switchable means for equalizing readback signals in said peak-to-bandedge roll-off regions, including means for providing speed-switchable frequency peaking characteristics and speed-switchable cut-off frequency characteristics and for shifting said frequency peaking characteristics and cut-off frequency characteristics in company with each other to said different peak-to-bandedge roll-off regions for different relative recording medium speeds; and means connected to said high-frequency equalization means for direct-current restoration of equalized readback signals, including means for providing a first signal analogous to said equalized readback signals and asymmetrical in a first sense relative to a reference voltage, means for providing a second signal analogous to said equalized readback signals and asymmetrical in a second sense relative to a reference voltage, and means connected to said first and second signal providing means for combining said first and second signals and disposing said combined first and second signals symmetrically about a direct-current reference voltage.

8. In apparatus for recovering an alternating signal read back from a recording medium, the improvement comprising in combination:

means for receiving said alternating readback signal;
means connected to said receiving means for providing a first signal analogous to said received alternating readback signal and asymmetrical in a first sense relative to a reference voltage;
means connected to said receiving means for providing a second signal analogous to said received alternating readback signal and asymmetrical in a second sense relative to a reference voltage; and
means connected to said first and second signal providing means for combining said first and second signals and disposing said combined first and second signals symmetrically about a direct-current reference voltage.

9. In apparatus for recovering alternating signals read back from a recording medium at different relative recording medium speeds, the improvement comprising in combination:

means for receiving said alternating readback signals;
speed-switchable means connected to said receiving means for providing a first signal analogous to said received alternating readback signals and asymmetrical in a first sense relative to a reference voltage;

speed-switchable means connected to said receiving means for providing a second signal analogous to said received alternating readback signals and asymmetrical in a second sense relative to a reference voltage; and means connected to said first and second signal providing means for combining said first and second signals and disposing said combined first and second signals symmetrically about a direct-current reference voltage.

10. Apparatus as claimed in claim 9, wherein:

said speed-switchable first signal providing means include first means for clamping first excursions of said alternating signal above said direct-current reference voltage;

said speed-switchable second signal providing means include second means for clamping second excursions of said alternating signal below said direct-current reference voltage; and said combining means include means for summing said clamped first and second excursions.

11. Apparatus as claimed in claim 10, wherein:

said speed-switchable first signal providing means include first speed-switchable means connected to said first clamping means for providing a speed-switchable time constant;

said speed-switchable second signal providing means include second speed-switchable means connected to said second clamping means for providing a speed-switchable time constant; and said apparatus include means connected to said first and second signal providing means for switching said first and second time constant providing means for different relative recording medium speeds.

12. Apparatus for direct-current restoration of an alternating signal, comprising in combination:

means for receiving said alternating signal;

means connected to said receiving means for providing a first signal analogous to said received alternating signal and asymmetrical in a first sense relative to a reference voltage;

means connected to said receiving means for providing a second signal analogous to said received alternating signal and asymmetrical in a second sense relative to a reference voltage; and means connected to said first and second signal providing means for combining said first and second signals and disposing said combined first and second signals symmetrically about a direct-current reference voltage.

13. Apparatus as claimed in claim 12, wherein:

said first signal providing means include first means for clamping first excursions of said alternating signal above said direct-current reference voltage;

said second signal providing means include second means for clamping second excursions of said alternating signal below said direct-current reference voltage; and said combining means include means for summing said clamped first and second excursions.

14. A method of direct-current restoring an alternating signal, comprising in combination the steps of:

providing a first signal analogous to said alternating signal and asymmetrical in a first sense relative to a reference voltage;

providing a second signal analogous to said alternating signal and asymmetrical in a second sense relative to a reference voltage;

providing a direct-current reference voltage;

combining said first and second signals; and disposing said combined first and second signals symmetrically about said direct-current reference voltage.

15. A method as claimed in claim 14, wherein:

said first signal is provided by clamping first excursions of said alternating signal above said direct-current reference voltage;

said second signal is provided by clamping second excursions of said alternating signal below said direct-current reference voltage; and said clamped first and second excursions are summed.

* * * * *